United States Patent
Gulik

[19]

[11] Patent Number: 6,091,801
[45] Date of Patent: *Jul. 18, 2000

[54] EMULATOR FOR A TELEPHONE SYSTEM

[75] Inventor: Kenneth J. Gulik, Westchester, Ill.

[73] Assignee: Rockwell Semiconductor Systems, Inc., Newport Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/018,607

[22] Filed: Feb. 5, 1998

Related U.S. Application Data

[63] Continuation-in-part of application No. 08/627,518, Apr. 4, 1996.

[51] Int. Cl.[7] .............................. H04M 5/00; H04M 3/08
[52] U.S. Cl. .............................. 379/10; 379/265; 379/266
[58] Field of Search ................................... 379/265, 266, 379/309, 34, 133, 9, 10, 1, 14–15; 395/653, 527, 500

[56] References Cited

U.S. PATENT DOCUMENTS

| | | | |
|---|---|---|---|
| 5,327,484 | 7/1994 | Connell et al. | 379/93.01 |
| 5,535,256 | 7/1996 | Maloney et al. | 379/265 |
| 5,555,297 | 9/1996 | Ochy et al. | 379/136 |
| 5,621,789 | 4/1997 | McCalmont et al. | 379/265 |
| 5,652,791 | 7/1997 | Sunderman et al. | 379/265 |
| 5,696,811 | 12/1997 | Maloney et al. | 379/265 |
| 5,784,452 | 7/1998 | Carney | 379/265 |
| 5,815,565 | 9/1998 | Doremus et al. | 379/265 |
| 5,818,907 | 10/1998 | Maloney et al. | 379/265 |
| 5,832,059 | 11/1998 | Aldred et al. | 379/34 |

*Primary Examiner*—Curtis A. Kuntz
*Assistant Examiner*—Rexford N Barnie
*Attorney, Agent, or Firm*—Welsh & Katz, Ltd.

[57] ABSTRACT

An emulator (10) for a telephone system having an automatic call distributor (11), a reporting system (12) for receiving information for the call distributor (11) and having at least one output device, and a simulator (20) for supplying simulated information of the call distributor (11) to the reporting system (12) when requested and at random time intervals.

6 Claims, 3 Drawing Sheets

EMULATOR FOR A TELEPHONE SYSTEM

The present invention, a CIP of 08/627,518 filed Apr. 4, 1996, relates to emulators for a telephone system.

BACKGROUND OF THE INVENTION

In the past, telephone systems have been provided having an automatic call distributor (ACD). In one form, the ACD has a reporting system with output devices for supplying reports and information to the user. When the software is being developed for the reporting system, it is necessary to obtain information from the ACD in order to test and debug the program for the reporting system. However, it is difficult to control the ACD such that it supplies the desired data type and data rate for checking the software of the reporting system.

SUMMARY OF THE INVENTION

A principal feature of the present invention is the provision of an emulator for a telephone system.

The emulator comprises an automatic call distributor, and a reporting system for receiving information from the call distributor and having at least one output device.

A feature of the invention is the provision of a simulator for supplying simulated information of the call distributor to the reporting system when requested and at random time intervals.

Another feature of the invention is that the type and rate of data can be controlled on the simulator.

Thus, a feature of the invention is that the simulator may be used to test the software of the reporting system in a simplified manner.

Further features will become more fully apparent in the following description of the embodiments of the invention, and from the appended claims.

DESCRIPTION OF THE PREFERRED EMBODIMENTS

Figure 1:
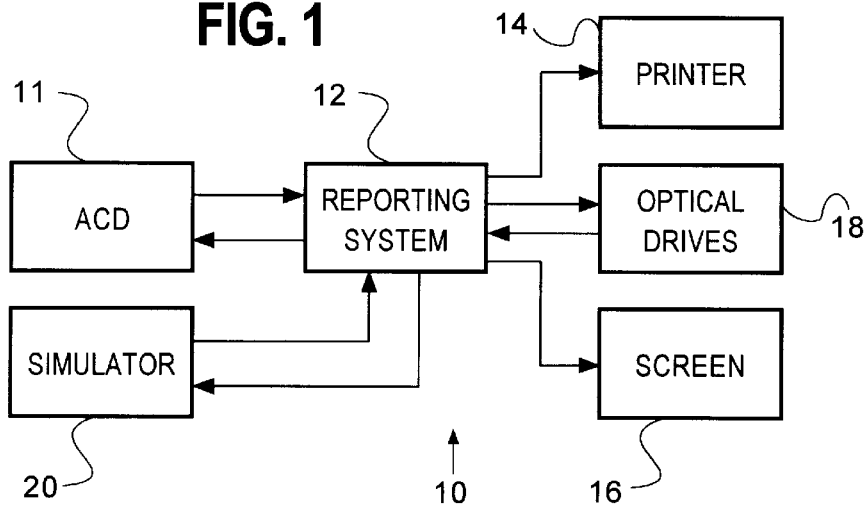
FIG. 1 is a block diagram of an emulator for a telephone system of the present invention.

Referring now to FIG. 1, there is shown an emulator generally designated 10 for a telephone system. The emulator 10 has an automatic call distributor (ACD) 11, and a reporting system 12 comprising a computer for the ACD. The reporting system 12 prepares reports for the user, such as by a printer 14, a screen 16, and optical drives 18 for the archives of data. The ACD supplies information to the reporting system 12, and the reporting system 12 may request information from the ACD.

As shown, the emulator 10 has a simulator 20 comprising a computer for supplying simulated information of the ACD to the reporting system 12, and the reporting system 12 can request information from the simulator 20 over an X.25 communication link. Thus, the ACD need not be connected in the emulator 10 when the simulator 20 is in use. The simulator 20 supplies the type of information and rate of information, such as periodic and real time, to the reporting system 12, which the ACD would normally supply to the reporting system 12 during normal operation of the telephone system. The type and rate of data supplied by the simulator 20 to the reporting system 12 may be controlled by commands issued to the simulator 20 by the user.

Figure 2:
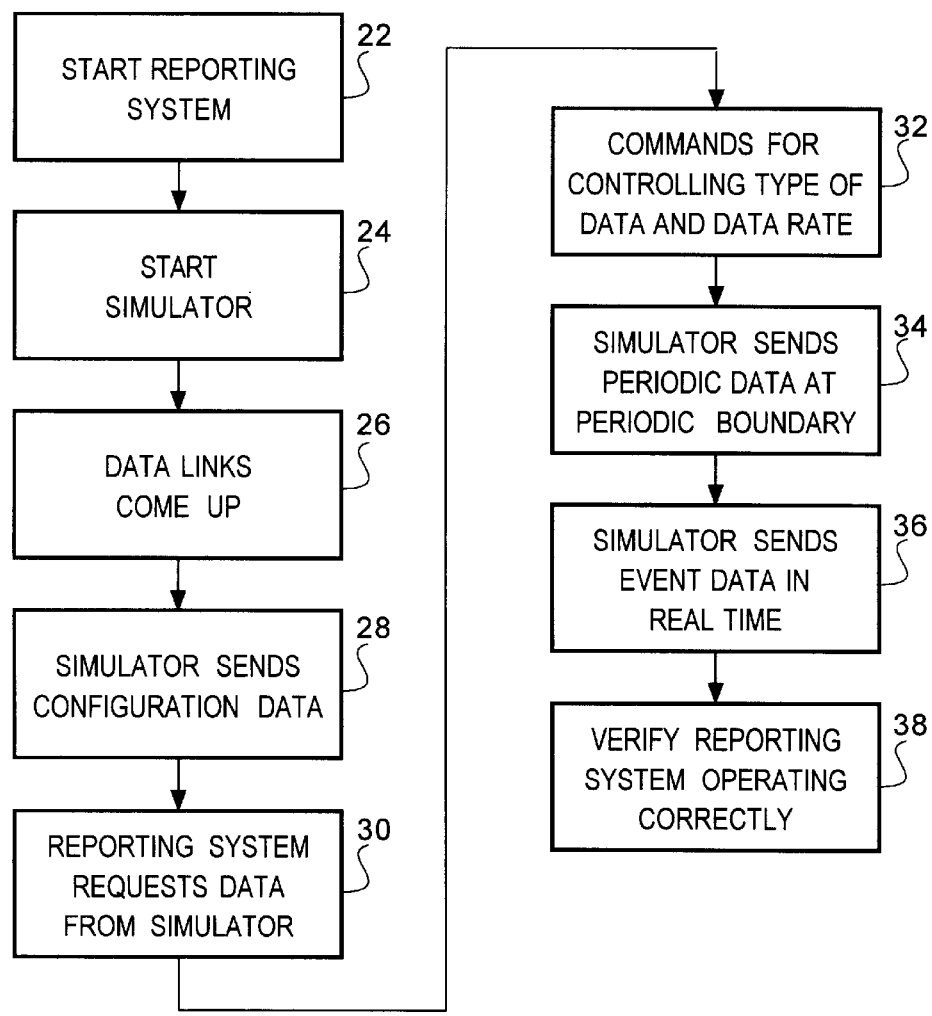
FIG. 2 is a flow chart of the simulator of FIG. 1.

A flow chart of the operation of the emulator 10 is given in FIG. 2. As shown in box 22, first the reporting system 12 is started, and in box 24 the simulator 20 is started, after which the data links come up in box 26 to verify that the communication is stable. Next, the simulator 20 sends configuration data in box 28 which comprises the initialization of data. In box 30, the reporting system 12 requests data from the simulator 20.

In box 32, commands are issued by the user to the simulator 20 for controlling the type of data sent and data rate sent, for example, periodic data and real time data. In box 34, the simulator 20 sends periodic data at the periodic boundary, and in box 36 the simulator 20 sends event data in real time. Finally, in box 38 it is verified that the reporting system 12 is operating properly by using the simulator 20 instead of the ACD.

Thus, in accordance with the present invention, a simulator 20 is used to emulate data normally issued by the ACD in order to test and debug the software in the reporting system 12, with the type of test data given to the reporting system 12 being controlled by the commands given by the user to the simulator 20 in a simplified manner.

Figure 3:
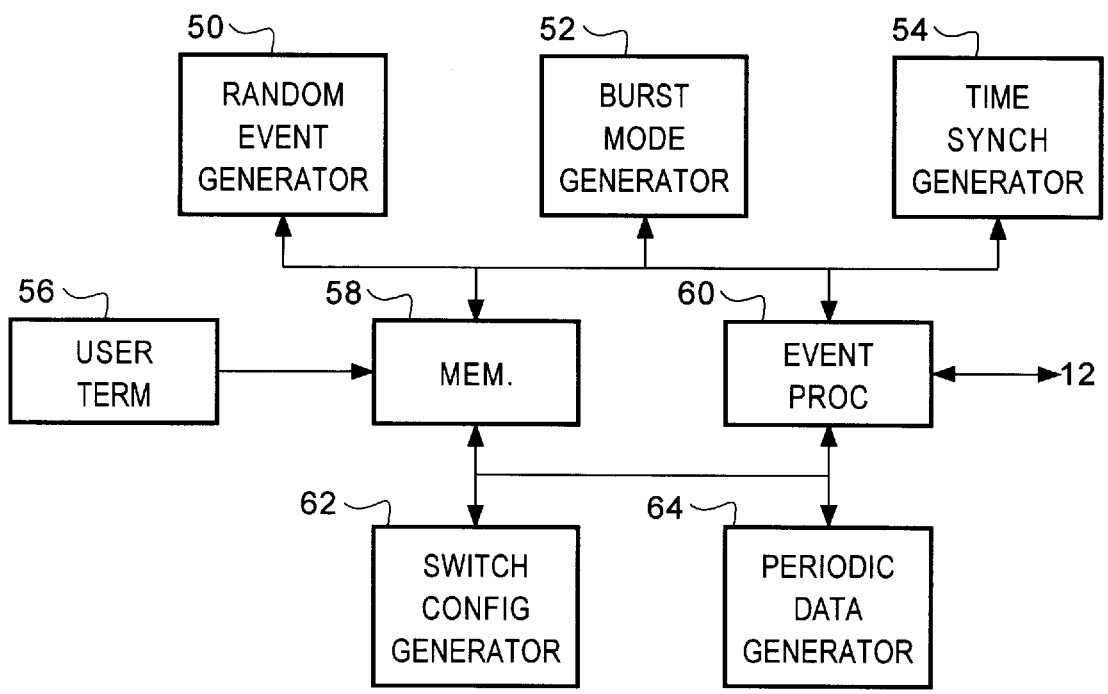
FIG. 3 is a block diagram of the simulator of FIG. 1.

FIG. 3 is a block diagram of the simulator 20. Included within the simulator 20 is an event processor 60 which functions to control data send to the reporting system 12. For example, upon start-up a switch configuration generator functions to generate a data set defining the type of switch which the simulator 20 will simulate. The event processor 60, upon receiving the data set, transfers it to the report generator 12.

The switch configuration generator 62 functions to retrieve data from a configuration look-up table in memory 58, format that data and transfer that data through the event processor 60 to the reporting system 12. The data set generated by the switch configuration generator 62 describes the basic configuration of the switch (e.g., number of agent stations, number of trunks connected to the PSTN, etc.).

The periodic data generator 64 similarly functions to format and deliver data to the event processor 60 for transfer to the reporting system 12. One difference, however, it that the simulator 20 responds with periodic data only when requested by the reporting system 12.

The periodic data which the simulator may include within a response to the reporting system 12 may include agent group data, trunk data, overflow-in data, overflow-out data, application vector data, application vector step data, intercept vector data, feature vector data, DNIS data, receiver group data, vector application data, agent information group data, or ANI data. The volume of each type of data is also selectable by a user and stored in a periodic data look-up table in memory.

The time synch generator 54 functions to provide time synchronization data to the reporting system 12. Time synchronization data is transmitted under control of the user terminal 56 either periodically, or upon entry of a specific command by the user.

The random event generator 50 functions to generate a random interrupt to the event processor 60. The random interrupt may be programmed to operate completely randomly or with the delivery of a fixed number of events falling anywhere within a fixed or variable time period. The fixed time period and number of events may be entered by the user through the user terminal 56 and stored in a simulator set-up table in memory 58. Limits on the variable time period may also be entered by a user through the terminal 56 into memory 58. The use of a random number generator operating within a fixed or variable time period allows the simulator 20 to more thoroughly test a reporting system 12 under the type of random conditions that an ACD 11 would experience in everyday use.

Upon receipt of an interrupt from the random event generator 50, the event processor 60 transmits event data to the reporting system 12. Event activity may include agent activity information, agent performance information, call records or transaction records.

Each event may include a number of fields. For example, agent activity may include such fields as; aa_staff, aa_staff_version, aa_time_stamp, aa_type, aa_link_id, aa_line_instance, aa_rec_disposition, aa_digit_type, aa_digits, aa_dnis_digits, aa_dnis_version, aa_call_duration, aa_talk_time, aa_hold_time, aa_appl_id, aa_appl_id_version, aa_vect_id, aa_vect_id_version, aa_agrp_id and aa_agrp_id_version.

Agent activity event records (as well as agent performance information, call records or transaction records) can be generated within the event processor 60 based upon data stored within each field of an agent activity event look-up table in memory 58. By editing ASCII data within each field, a user (through the user terminal 56) can manipulate specific data elements in order to test and debug specific software components of the reporting system 12.

To use the simulator, the user programs the respective look-up tables with periodic and event processing information. For example, the user may enter a value into the memory 58 specifying the number of each type of event per time period (e.g., every 10 ms, 500 ms, etc.). For example, the user may enter a value of "1" for each of the agent activity information, agent performance information, call records and transaction records. As such, the event processor may send one of each type of record during each time period.

Further, the event processor 60 may also function to determine a proportion of each type of event and maintain that proportion during transmission of events. For example where the first event has a value of "100" and the second event has a value of "25", then the event processor 56 may function to maintain a proportion of 4 to 1 in the sequence of events transferred.

Figure 4:
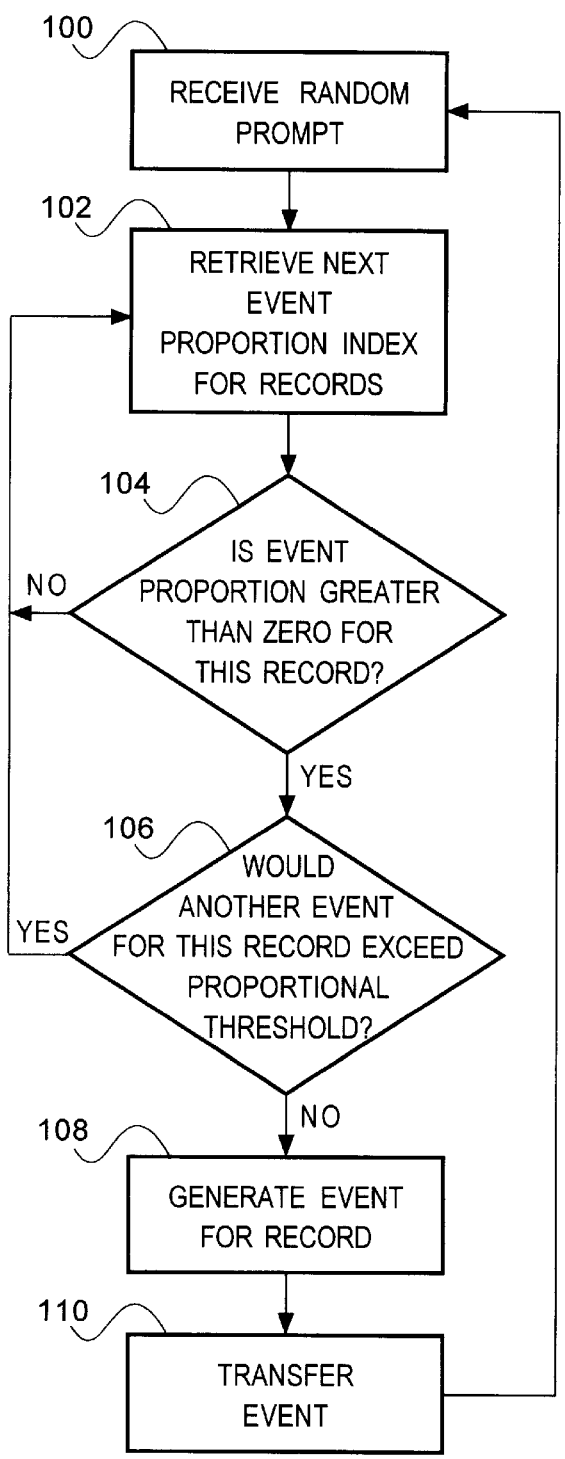
FIG. 4 is a flow chart depicting process steps of the simulator of FIG. 3.

FIG. 4 is a flow chart of the steps that may be executed by the simulator 20 in sending event data to the reporting system 12. As shown each time the event processor 60 receives a random prompt 100, it retrieves 102 the next event of the agent activity information, agent performance information, call records or transaction records. The event processor then determines what proportion this particular event is to form of the total events. If the proportion is greater than zero 104 (i.e., the event is to be transmitted as simulated information), the processor 56 determines whether the proportion of this type of event is in the proper ratio. If it does not exceed the proportional threshold 106, the event is generated 108 and transferred 110.

As the simulator 20 processes events, it also monitors for data requests that may be transferred from the reporting system 12 at logging boundaries. At a logging boundary, the reporting system 12 may transmit a data request to the simulator 20. In response, the simulator 20 transmits back a simulated set of logged events.

Figure 5:
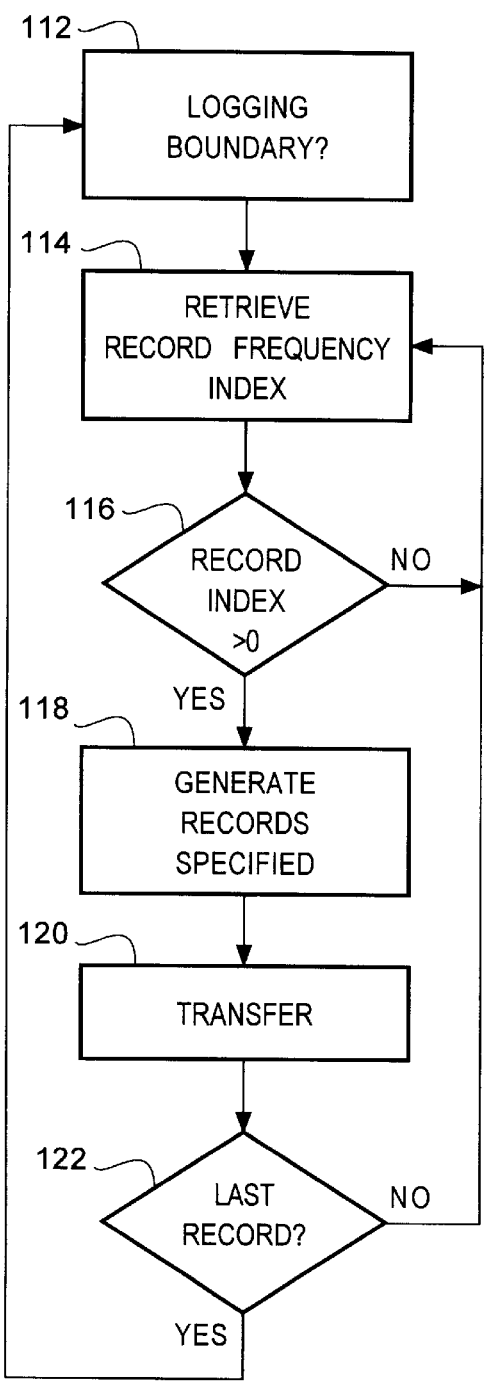
FIG. 5 is a flow chart depicting process steps of the emulator of FIG. 3.

FIG. 5 depicts a flow chart of steps that may be executed at a logging boundary. As shown, at a logging boundary, the simulator 20 receives a data request 112. Upon receiving a data request 112, the event processor 60 retrieves 114 a number of each type of record that is to be transmitted from memory 58. If the number is greater than zero 116, the event processor 60 formulates 118 that number of records and transfers them 120 to the reporting system 12.

The simulator 20 then checks 122 to see whether this is the last record. If it is not, the simulator 20 retrieves 114 the next record and the process repeats until each record type has been processed.

To further test the reporting system 12, the user of the simulator 20 may also enter a burst mode where events may be transferred at an elevated rate. Through the user terminal 56, the user may enter the command "BURST -cp -10 -ap -5-aa -3". Entry of this command may be used to send ten call records per second, 5 agent performance records per second and 3 agent activity records per seconds to the reporting system 12.

Alternatively, the command "BURST -ap -aa -cp -tr" could be send. Entry of this command would send agent performance records, agent activity records, call records and transaction records on a continuous basis. Similarly, entry of the command "BURST -aa" would cause the continuous transmission of only agent activity records.

The foregoing detailed description is given for clearness of understanding only, and no unnecessary limitations should be understood therefrom, as modifications will be obvious to those skilled in the art.

What is claimed is:
1. An emulator for a telephone system, comprising:
   a reporting system for receiving information from a simulator which simulates an automatic call distributor of the telephone system, the reporting system having at least one output device; and
   the simulator for supplying simulated call processing information simulating the call distributor to the reporting system, said simulator supplying the simulated call processing information when requested by the reporting system and at random time intervals.
2. The emulator of claim 1 including means for controlling the type of data simulated by the simulator.
3. The emulator of claim 1 including means for controlling the data rate of data simulated by the simulator.
4. The emulator of claim 1 wherein the simulated information comprises periodic data.
5. The emulator of claim 1 wherein the simulated information is real time data.
6. The emulator of claim 1 wherein the simulator further comprises means for transferring data under a burst mode.

* * * * *